United States Patent
White et al.

(10) Patent No.: US 12,229,178 B2
(45) Date of Patent: Feb. 18, 2025

(54) FEATURE EXTRACTION AND SELECTION IN INFORMATION PROCESSING SYSTEM ENVIRONMENT

(71) Applicant: Dell Products L.P., Round Rock, TX (US)

(72) Inventors: William Jeffery White, Plano, TX (US); Said Tabet, Austin, TX (US); John S. Harwood, Boston, MA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/114,196

(22) Filed: Feb. 24, 2023

(65) Prior Publication Data
US 2024/0289369 A1    Aug. 29, 2024

(51) Int. Cl.
   *G06F 16/35*    (2019.01)
   *H04L 67/10*    (2022.01)

(52) U.S. Cl.
   CPC .............. *G06F 16/35* (2019.01); *H04L 67/10* (2013.01)

(58) Field of Classification Search
   CPC ................................. G06F 16/35; H04L 67/10
   See application file for complete search history.

(56) References Cited

U.S. PATENT DOCUMENTS

| | | | |
|---|---|---|---|
| 11,113,175 B1* | 9/2021 | Adamo | G06F 40/216 |
| 2014/0379615 A1 | 12/2014 | Brigham et al. | |
| 2014/0380285 A1 | 12/2014 | Gabel et al. | |
| 2015/0100943 A1 | 4/2015 | Gabel et al. | |
| 2015/0235405 A1* | 8/2015 | Leppanen | G06T 13/80 345/473 |
| 2016/0092476 A1* | 3/2016 | Stojanovic | G06F 3/04883 707/805 |
| 2019/0019160 A1 | 1/2019 | Champaneria | |
| 2019/0250998 A1* | 8/2019 | Bedadala | G06F 11/1464 |
| 2020/0242525 A1* | 7/2020 | Zaslavsky | G06N 7/01 |
| 2020/0250270 A1* | 8/2020 | Yu | G06F 40/126 |
| 2022/0035728 A1* | 2/2022 | Muras | G06F 40/216 |
| 2022/0035799 A1 | 2/2022 | Bhutada et al. | |
| 2023/0035344 A1 | 2/2023 | White et al. | |
| 2023/0156074 A1* | 5/2023 | Kim | H04L 12/4633 709/201 |

OTHER PUBLICATIONS

Wlodzislaw et al., "Comparison of feature ranking methods based on information entropy", IEEE, pp. 1415-1419 (Year: 2004).*
Li et al., "Trees Weighting Random Forest Method for Classifying High-Dimensional Noisy Data", IEEE, pp. 160-163 (Year: 2010).*

(Continued)

*Primary Examiner* — Jared M Bibbee
(74) *Attorney, Agent, or Firm* — Ryan, Mason & Lewis, LLP

(57) ABSTRACT

Data characterization techniques in an information processing system environment are disclosed. In one example, at least one processing device is configured to obtain data associated with execution of at least one of a plurality of applications in an information processing system. The processing device extracts features from the obtained data, and then selects a reduced subset of features from the extracted features for use in a machine learning classification process configured to determine an intent of the obtained data.

20 Claims, 6 Drawing Sheets

(56) References Cited

OTHER PUBLICATIONS

J. Tan, "Feature Selection for Machine Learning in Python—Wrapper Methods," https://towardsdatascience.com/feature-selection-for-machine-learning-in-python-wrapper-methods-2b5e27d2db31, Oct. 13, 2020, 13 pages.
M. Hall, "Class InfoGainAttributeEval," https://weka.sourceforge.io/doc.dev/weka/attributeSelection/InfoGainAttributeEval.html, Accessed Nov. 29, 2022, 8 pages.
E. Frank et al., "Class Bagging," https://weka.sourceforge.io/doc.dev/weka/classifiers/meta/Bagging.html, Accessed Nov. 29, 2022, 13 pages.
M. Hall, "Class WrapperSubsetEval," https://weka.sourceforge.io/doc.dev/weka/attributeSelection/WrapperSubsetEval.html, Accessed Nov. 29, 2022, 15 pages.
M. Hall, "Class Ranker," https://weka.sourceforge.io/doc.dev/weka/attributeSelection/Ranker.html, Accessed Nov. 29, 2022, 10 pages.
M. Hall, "Class GainRatioAttributeEval," https://weka.sourceforge.io/doc.dev/weka/attributeSelection/GainRatioAttributeEval.html, Accessed Nov. 29, 2022, 7 pages.
A, Gupta et al., "Unsupervised Meta-Learning for Reinforcement Learning," arXiv:1806.04640v3, Apr. 30, 2020, 12 pages.
T. Jin et al., "Towards Autonomic Data Management for Staging-based Coupled Scientific Workflows," Journal of Parallel and Distributed Computing, preprint, Nov. 9, 2019, 42 pages.
R. Ross et al., "Mochi: Composing Data Services for High-Performance Computing Environments," Journal of Computer Science and Technology, Jan. 17, 2020, 28 pages.
A. R. Zamani et al., "An Edge-aware Autonomic Runtime for Data Streaming and In-transit Processing," Future Generation Computer Systems, preprint, Feb. 29, 2020, 15 pages.

\* cited by examiner

FEATURE EXTRACTION AND SELECTION IN INFORMATION PROCESSING SYSTEM ENVIRONMENT

FIELD

The field relates generally to information processing, and more particularly to techniques for data characterization in information processing systems.

BACKGROUND

Information processing systems that execute application programs or, more simply, applications, are increasingly deployed in a distributed manner. For example, processing of application tasks may occur on different computing devices that can be distributed functionally and/or geographically. The information processing system environment may also have a large amount of computing devices and, overall, process a vast amount of data. For the information processing system environment to execute efficiently, it is important that data be properly characterized or otherwise managed. However, most information processing system environments leave the task of data characterization to the applications themselves and/or to corresponding storage services.

SUMMARY

Illustrative embodiments provide data characterization techniques comprising data feature extraction and selection for use in an information processing system environment.

In one embodiment, an apparatus comprises at least one processing device comprising a processor coupled to a memory. The processing device is configured to obtain data associated with execution of at least one of a plurality of applications in an information processing system. The processing device extracts features from the obtained data, and then selects a reduced subset of features from the extracted features for use in a machine learning classification process configured to determine an intent of the obtained data.

Advantageously, illustrative embodiments are configured to selectively update one or more classifiers associated with the machine learning classification process when an optimizing feature is discovered to improve operations of the one or more classifiers.

These and other illustrative embodiments include, without limitation, methods, apparatus, networks, systems and processor-readable storage media.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud and edge computing and storage systems, as well as other types of processing systems comprising various combinations of physical and virtual processing resources.

Figure 1:
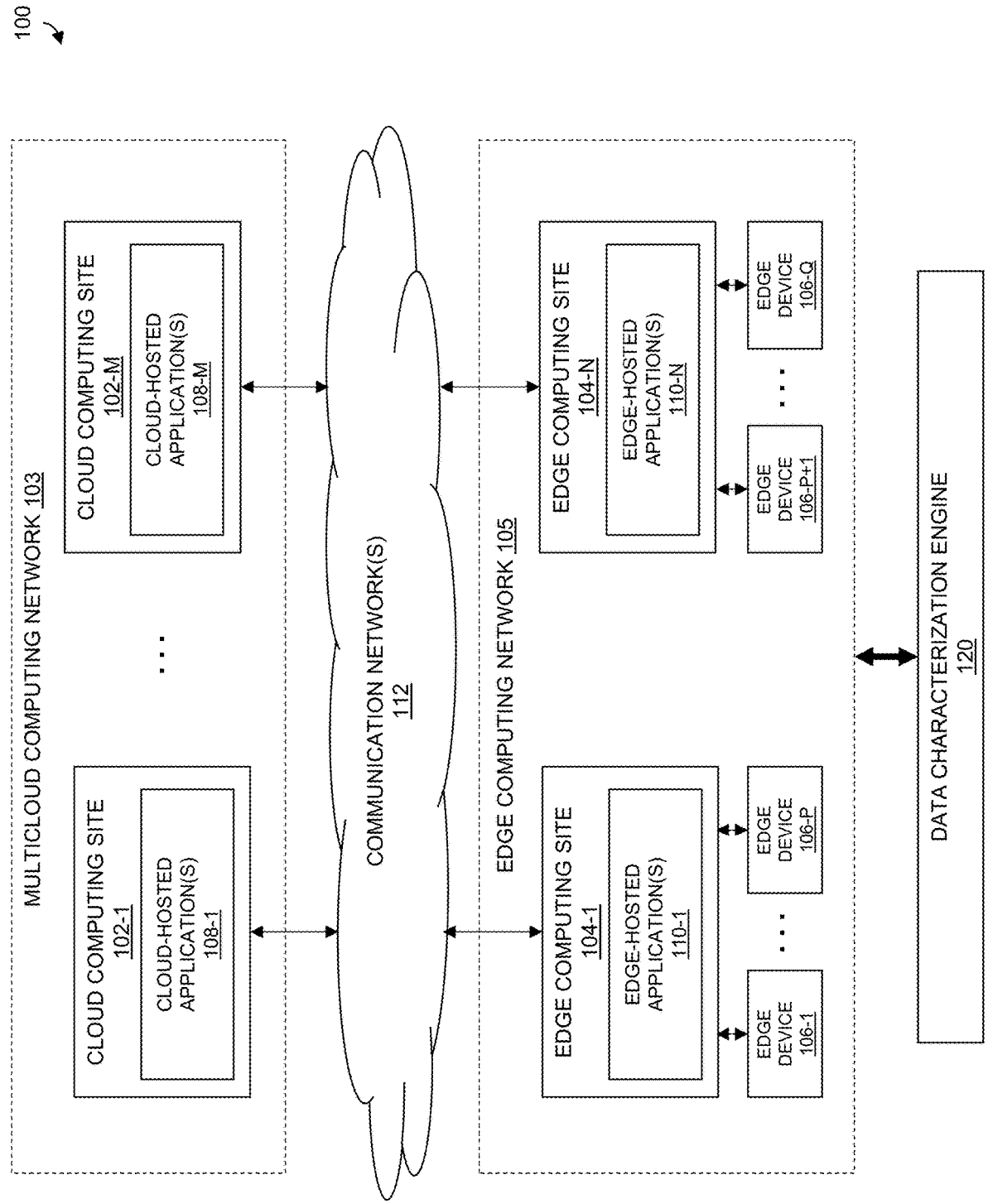
FIG. 1 illustrates an information processing system environment configured with data characterization functionalities according to an illustrative embodiment.

FIG. 1 shows an information processing system environment 100 configured in accordance with an illustrative embodiment. The information processing system environment 100 is illustratively assumed to be implemented across multiple processing platforms and provides data management functionality including data characterization techniques as will be further described below.

The information processing system environment 100 comprises a set of cloud computing sites 102-1, . . . 102-M (collectively, cloud computing sites 102) that collectively comprise a multicloud computing network 103. Information processing system environment 100 also comprises a set of edge computing sites 104-1, . . . 104-N (collectively, edge computing sites 104, also referred to as edge computing nodes or edge servers 104) that collectively comprise at least a portion of an edge computing network 105. The cloud computing sites 102, also referred to as cloud data centers 102, are assumed to comprise a plurality of cloud devices or cloud nodes (not shown in FIG. 1) that run sets of cloud-hosted applications 108-1, . . . 108-M (collectively, cloud-hosted applications 108). Each of the edge computing sites 104 is assumed to comprise compute infrastructure or edge assets (not shown in FIG. 1) that run sets of edge-hosted applications 110-1, . . . 110-N (collectively, edge-hosted applications 110). As used herein, the term "application" is intended to be broadly construed to include applications, microservices, and other types of services.

Information processing system environment 100 also includes a plurality of edge devices that are coupled to each of the edge computing sites 104 as part of edge computing network 105. A set of edge devices 106-1, . . . 106-P are coupled to edge computing site 104-1, and a set of edge devices 106-P+1, . . . 106-Q are coupled to edge computing site 104-N. The edge devices 106-1, . . . 106-Q are collectively referred to as edge devices 106. Edge devices 106 may comprise, for example, physical computing devices such as Internet of Things (IoT) devices, sensor devices (e.g., for telemetry measurements, videos, images, etc.), mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The edge devices 106 may also or alternately comprise virtualized computing resources, such as virtual machines (VMs), containers, etc. In this illustration, the edge devices 106 may be tightly coupled or loosely coupled with other devices, such as one or more input sensors and/or output instruments (not shown). Couplings can take many forms, including but not limited to using intermediate networks, interfacing equipment, connections, etc.

Edge devices 106 in some embodiments comprise respective computers associated with a particular company, organization or other enterprise. In addition, at least portions of information processing system environment 100 may also be referred to herein as collectively comprising an "enterprise."

Numerous other operating scenarios involving a wide variety of different types and arrangements of processing nodes are possible, as will be appreciated by those skilled in the art.

Note that the number of different components referred to in FIG. 1, e.g., M, N, P, Q, can each be different numbers or some of them the same numbers. Embodiments illustrated herein are not intended to be limited to any particular numbers of components.

As shown in FIG. 1, edge computing sites 104 are connected to cloud computing sites 102 via one or more communication networks 112 (also referred to herein as networks 112). Although not explicitly shown, edge devices 106 may be coupled to the edge computing sites 104 via networks 112. Networks 112 coupling the cloud computing sites 102, edge computing sites 104 and edge devices 106 are assumed to comprise a global computer network such as the Internet, although other types of private and public networks can be used, including a wide area network (WAN), a local area network (LAN), a satellite network, a telephone or cable network, a cellular network, a wireless network such as a WiFi or WiMAX network, or various portions or combinations of these and other types of networks. In some embodiments, a first type of network couples edge devices 106 to edge computing sites 104, while a second type of network couples the edge computing sites 104 to the cloud computing sites 102. Various other examples are possible.

In some embodiments, one or more of cloud computing sites 102 and one or more of edge computing sites 104 collectively provide at least a portion of an information technology (IT) infrastructure operated by an enterprise, where edge devices 106 are operated by users of the enterprise. The IT infrastructure comprising cloud computing sites 102 and edge computing sites 104 may therefore be referred to as an enterprise system. As used herein, the term "enterprise system" is intended to be construed broadly to include any group of systems or other computing devices. In some embodiments, an enterprise system includes cloud infrastructure comprising one or more clouds (e.g., one or more public clouds, one or more private clouds, one or more hybrid clouds, combinations thereof, etc.). The cloud infrastructure may host at least a portion of one or more of cloud computing sites 102 and/or one or more of the edge computing sites 104. A given enterprise system may host assets that are associated with multiple enterprises (e.g., two or more different businesses, organizations or other entities). In another example embodiment, one or more of the edge computing sites 104 may be operated by enterprises that are separate from, but communicate with, enterprises which operate one or more cloud computing sites 102.

Although not explicitly shown in FIG. 1, one or more input-output devices such as keyboards, displays or other types of input-output devices may be used to support one or more user interfaces to each of cloud computing sites 102, edge computing sites 104 and edge devices 106, as well as to support communication between each of cloud computing sites 102, edge computing sites 104, edge devices 106, and other related systems and devices not explicitly shown.

As noted above, cloud computing sites 102 host cloud-hosted applications 108 and edge computing sites 104 host edge-hosted applications 110. Edge devices 106 may exchange information with cloud-hosted applications 108 and/or edge-hosted applications 110. For example, edge devices 106 or edge-hosted applications 110 may send information to cloud-hosted applications 108. Edge devices 106 or edge-hosted applications 110 may also receive information (e.g., such as instructions) from cloud-hosted applications 108.

It should be noted that, in some embodiments, requests and responses or other information may be routed through multiple edge computing sites. While FIG. 1 shows an embodiment where each edge computing site 104 is connected to cloud computing sites 102 via the networks 112, this is not a requirement. In other embodiments, one or more of edge computing sites 104 may be connected to one or more of cloud computing sites 102 via one or more other ones of edge computing sites 104 (e.g., edge computing sites 104 may be arranged in a hierarchy with multiple levels, possibly including one or more edge data centers that couple edge computing sites 104 with cloud computing sites 102).

It is to be appreciated that multicloud computing network 103, edge computing network 105, and edge devices 106 may be collectively and illustratively referred to herein as a "multicloud edge platform." In some embodiments, edge computing network 105 and edge devices 106 are considered a "distributed edge system."

Still further shown in FIG. 1, information processing system environment 100 comprises a data characterization engine 120. Data characterization engine 120 is generally shown connected to edge computing network 105 meaning that data characterization engine 120 is connected to each of edge computing sites 104, edge-hosted applications 110, edge devices 106, and one or more other components (not expressly shown in FIG. 1) that are part of or otherwise associated with edge computing network 105. In some embodiments, an edge orchestration and scheduling platform (e.g., a cloud native (CN) orchestrator) and one or more edge zone controllers may be part of edge computing network 105 and, accordingly, connected to data characterization engine 120. Data characterization engine 120 is also connected to each of cloud computing sites 102, cloud-hosted applications 108, and one or more other components (not expressly shown in FIG. 1) that are part of or otherwise associated with multicloud computing network 103 via edge computing network 105 and the one or more communication networks 112, and/or through one or more other networks.

While data characterization engine 120 is shown as a single block external to edge computing network 105, it is to be appreciated that, in some embodiments, parts or all of data characterization engine 120 may be implemented within edge computing network 105 and reside on one or more of the components that comprise edge computing network 105. For example, modules that constitute data characterization engine 120 may be deployed on one or more of edge computing sites 104, edge devices 106, and any other components not expressly shown. In some alternative embodiments, one or more modules of data characterization engine 120 can be implemented on one or more cloud computing sites 102. Also, it is to be understood that while data characterization engine 120 refers to data management in the context of applications, the term application is intended to be broadly construed to include applications, microservices, and other types of services.

As will be explained in greater detail herein, data characterization engine 120 is configured to provide data management functionalities in the multicloud edge platform embodied via multicloud computing network 103 and edge computing network 105.

Referring still to FIG. 1, in some embodiments, edge data from edge devices 106 may be stored in a database or other data store (not shown), either locally at edge computing sites 104 and/or in processed or transformed format at different endpoints (e.g., cloud computing sites 102, edge computing sites 104, other ones of edge devices 106, etc.). The database or other data store may be implemented using one or more storage systems that are part of or otherwise associated with one or more of cloud computing sites 102, edge computing sites 104, and edge devices 106. By way of example only, the storage systems may comprise a scale-out all-flash content addressable storage array or other type of storage array. The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage. Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Cloud computing sites 102, edge computing sites 104, edge devices 106, and data characterization engine 120 in the FIG. 1 embodiment are assumed to be implemented using processing devices, wherein each such processing device generally comprises at least one processor and an associated memory.

It is to be appreciated that the particular arrangement of cloud computing sites 102, edge computing sites 104, edge devices 106, cloud-hosted applications 108, edge-hosted applications 110, communications networks 112, and data characterization engine 120 illustrated in the FIG. 1 embodiment is presented by way of example only, and alternative arrangements can be used in other embodiments.

It is to be understood that the particular set of components shown in FIG. 1 is presented by way of illustrative example only, and in other embodiments additional or alternative components may be used. Thus, another embodiment may include additional or alternative systems, devices and other network entities, as well as different arrangements of modules and other components.

Cloud computing sites 102, edge computing sites 104, edge devices 106, data characterization engine 120, and other components of the information processing system environment 100 in the FIG. 1 embodiment are assumed to be implemented using one or more processing platforms each comprising one or more processing devices having a processor coupled to a memory. Such processing devices can illustratively include particular arrangements of compute, storage, and network resources.

Cloud computing sites 102, edge computing sites 104, edge devices 106, data characterization engine 120, or components thereof, may be implemented on respective distinct processing platforms, although numerous other arrangements are possible. For example, in some embodiments at least portions of edge devices 106, edge computing sites 104, and data characterization engine 120 may be implemented on the same processing platform. One or more of edge devices 106 can therefore be implemented at least in part within at least one processing platform that implements at least a portion of edge computing sites 104. In other embodiments, one or more of edge devices 106 may be separated from but coupled to one or more of edge computing sites 104. Various other component coupling arrangements are contemplated herein.

The term "processing platform" as used herein is intended to be broadly construed so as to encompass, by way of illustration and without limitation, multiple sets of processing devices and associated storage systems that are configured to communicate over one or more networks. For example, distributed implementations of information processing system environment 100 are possible, in which certain components of the system reside in one data center in a first geographic location while other components of the system reside in one or more other data centers in one or more other geographic locations that are potentially remote from the first geographic location. Thus, it is possible in some implementations of the system for cloud computing sites 102, edge computing sites 104, edge devices 106, and data characterization engine 120, or portions or components thereof, to reside in different data centers. Distribution as used herein may also refer to functional or logical distribution rather than to only geographic or physical distribution. Numerous other distributed implementations are possible.

In some embodiments, information processing system environment 100 may be implemented in part or in whole using a Kubernetes container orchestration system. Kubernetes is an open-source system for automating application deployment, scaling, and management within a container-based information processing system comprised of components referred to as pods, nodes and clusters. Types of containers that may be implemented or otherwise adapted within the Kubernetes system include, but are not limited to, Docker containers or other types of Linux containers (LXCs) or Windows containers. Kubernetes has become the prevalent container orchestration system for managing containerized workloads. It is rapidly being adopted by many enterprise-based IT organizations to deploy its application programs (applications). By way of example only, such applications may include stateless (or inherently redundant applications) and/or stateful applications. While the Kubernetes container orchestration system is used to illustrate various embodiments, it is to be understood that alternative container orchestration systems, as well as information processing systems other than container-based systems, can be utilized.

Some terminology associated with the Kubernetes container orchestration system will now be explained. In general, for a Kubernetes environment, one or more containers are part of a pod. Thus, the environment may be referred to, more generally, as a pod-based system, a pod-based container system, a pod-based container orchestration system, a pod-based container management system, or the like. As mentioned above, the containers can be any type of container, e.g., Docker container, etc. Furthermore, a pod is typically considered the smallest execution unit in the Kubernetes container orchestration environment. A pod encapsulates one or more containers. One or more pods are executed on a worker node. Multiple worker nodes form a cluster. A Kubernetes cluster is managed by at least one manager node. A Kubernetes environment may include multiple clusters respectively managed by multiple manager nodes. Furthermore, pods typically represent the respective processes running on a cluster. A pod may be configured as a single process wherein one or more containers execute one or more functions that operate together to implement the process. Pods may each have a unique Internet Protocol (IP) address enabling pods to communicate with one another, and for other system components to communicate with each pod. Still further, pods may each have persistent storage volumes associated therewith. Configuration information (configuration objects) indicating how a container executes can be specified for each pod. It is to be appreciated, however, that embodiments are not limited to Kubernetes container orchestration techniques or the like.

Additional examples of processing platforms utilized to implement cloud computing sites 102, edge computing sites 104, edge devices 106, data characterization engine 120, and other components of the information processing system environment 100 in illustrative embodiments will be described in more detail below in conjunction with FIGS. 5 and 6.

As explained above, when an information processing system environment is distributed in nature such as, for example, information processing system environment 100, data management can be significantly hampered. In addition, when the applications that are executed in the information processing system environment, e.g., cloud-hosted applications 108 and edge-hosted applications 110, are microservices, the nature of microservices can greatly exacerbate data management.

Figure 2:
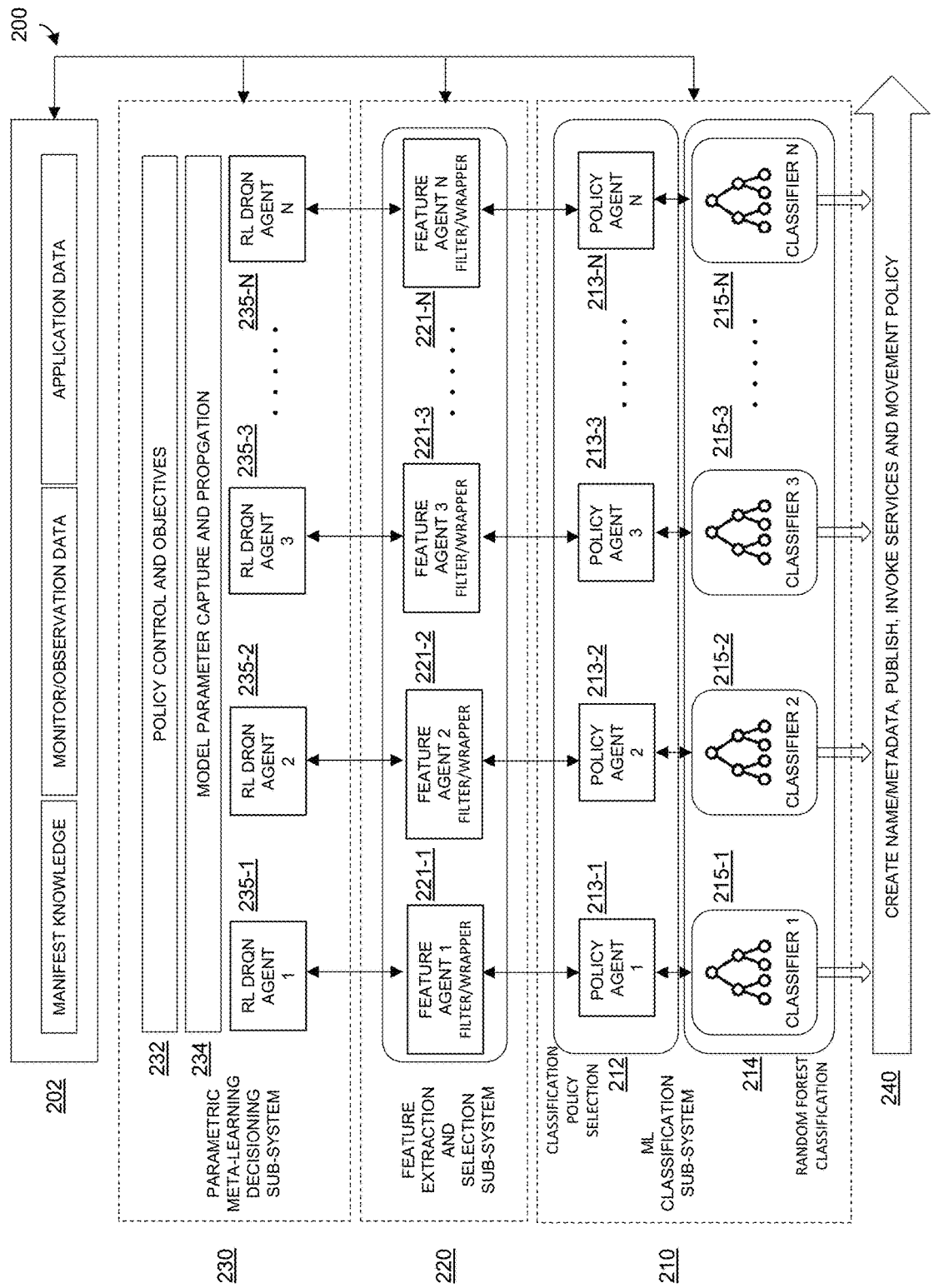
FIG. 2 illustrates a data characterization architecture according to an illustrative embodiment.

Referring now to FIG. 2, an exemplary data characterization architecture 200 (also referred to herein simply as architecture 200) is depicted for data characterization according to an illustrative embodiment. It is to be appreciated that architecture 200, in some embodiments, is implemented via data characterization engine 120 of FIG. 1. However, modules, steps, and other functional aspects of architecture 200 can be implemented in one or more components of edge computing network 105 and, and multicloud computing network 103 as may be needed.

Architecture 200 according to illustrative embodiments overcomes the above and other drawbacks with existing data management, especially in a multicloud edge platform wherein at least some of the applications executing therein are microservices and which collectively generate a vast amount of data.

More particularly, it is realized herein that multicloud edge platforms have significantly different requirements from cloud or telco platforms. Edge drivers (e.g., processing devices in edge computing sites 104, edge devices 106, etc.) are significantly influenced by data processing, operational technology workloads, and control requirements. The edge computing paradigm is by definition a distributed platform and data access cannot be assumed. Data visibility, access, movement, security, and services must be provided to make intelligent orchestration decisions and ensure stable application execution.

Existing platform orchestration and management layers largely ignore datasets as a factor. This is left to the application itself and/or storage-enabled services. For example, these services are Infrastructure-as-a-Service (IaaS) for storage and support-specific application frameworks for analytics and enabling artificial intelligence (AI) data pipelines.

The edge computing paradigm presents significant challenges to the existing frameworks for data management which focus on IaaS and support-specific application frameworks. Still further, a platform that implements both edge and multicloud computing paradigms will introduce nonlocality and untimely reachability assumption to data. Note that many of the use cases for the edge computing paradigm focus on data. An edge platform is not necessarily local to some sources of data and remote from a cloud platform. Even in a multicloud platform, the data may be resident in another cloud presenting accessibility issues and significant costs for data egress.

Illustrative embodiments overcome the above and other technical issues with existing data management approaches, particularly, although not exclusively, in information processing system environments with edge and/or multicloud platforms.

More particularly, as will be explained in detail below, architecture 200 is configured to provide data characterization functionalities to enable, inter alia, data visibility, access, movement, security, and/or other services to make intelligent orchestration decisions and ensure stable application execution. As shown, architecture 200 comprises a machine learning (ML) classification sub-system 210, a feature extraction and selection sub-system 220, and a parametric meta-learning decisioning sub-system 230 operatively coupled as illustrated in FIG. 2. In general, architecture 200 obtains input data 202 from an information processing system environment (e.g., information processing system environment 100) including, but not limited to, manifest knowledge, data generated or otherwise obtained via monitoring and/or observation, and application data. Architecture 200 processes this vast amount of input data 202 and yields classified data at a high probability inference level. From the classified data, global naming and metadata protocols can be applied to enable data visibility, access, movement, security, and/or other services to make intelligent orchestration decisions and ensure stable application execution (collectively illustrated as 240 in FIG. 2) across the entirety of the information processing system environment (multicloud edge platform).

It is realized herein that existing methods for detecting and classifying data are based on the location of a file/object such as a directory or object store, or on the type of data (e.g., html, jpeg, mpeg, text, etc.). A multicloud edge platform requires a different framework above and beyond data location/type descriptors. It is realized herein that a multicloud edge needs to understand the intent of the data.

Accordingly, architecture 200 detects data production, semantically classifies data and advertises the data to provide visibility across the multicloud edge platform. The classification is used to generate a global name with semantic meaning (e.g., the global name can encode a location of production, an application that produced the data, and a targeted use of the data). The global name can be unique to the multicloud edge platform. This allows the data to be managed autonomously during application initial scheduling and lifecycle scheduling/management so that the platform may keep the data consistent and accessible to the applications. Applications produce a vast array of data types for different uses. Training an ML classifier model using statistical learning is not effective as the system has a very broad distribution with a wide set of use cases and would not be able to converge at acceptable inference probability. As such, architecture 200 uses machine learning, reinforcement learning, input knowledge, extracted data structure information and a meta-learning framework to assure high probability inference and operates autonomously to classify data's intended use (intent).

As will be further explained below in detail, ML classification sub-system 210 is configured to perform the actual classification of the data structure (e.g., data structure in this context illustratively refers to file, object, stream, etc.) and a policy selector provides the optimal learning context for the classifier to enable a focus on operations. Further, feature extraction and selection sub-system 220 is configured to reduce the classification features and input knowledge to enable focusing on optimizing operations. Still further, parametric meta-learning decisioning sub-system 230 is configured to select appropriate training features for the classifier framework (ML classification sub-system 210) by retaining a memory of global classification efficacy for a particular edge vertical. Such meta-learning framework enables architecture 200 to focus on global feature selection for offline training of overall edge vertical classifiers, and on global platform optimization through feature selection for offline training of overall edge vertical classifiers. Each of the main sub-systems of architecture 200 will now be described in detail below.

As further shown in FIG. 2, ML classification sub-system 210 comprises a classification policy selection layer 212 comprising a plurality of policy agent modules 213-1, 213-2, 213-3, . . . , 213-N (collectively referred to as policy agents 213 or individually as policy agent 213) operatively coupled to a random forest classification layer 214 comprising a plurality of classifier modules 215-1, 215-2, 215-3, . . . , 215-N (collectively referred to as classifiers 215 or individually as classifier 215).

It is realized herein that existing machine/deep learning frameworks are not generally well optimized to be able to address the distribution of the data needed for data structure classification. This is due to the wide variance of use cases that applications create making it exceedingly difficult to select a training dataset that reflects the varied data structures. What can help ameliorate the problem is a significant level of input knowledge base (e.g., application producing the data, the type of data, the location of the data, application generated metadata, etc.). Also, meta-learning frameworks and strong feature selection can be used (as will be further explained herein). In addition, the classification framework should be computationally efficient and flexible.

Accordingly, in one or more illustrative embodiments, ML classification sub-system 210 utilizes random forest classifiers for classifiers 215. Each classifier 215 can be trained and programmed in an online manner through bagging/boosting by changing the distribution of the forest. Each classifier 215 can also be made computationally efficient by controlling the number of decision trees. Still further, each classifier 215 is flexible in terms of control making it amenable for policy control respectively applied by each policy agent 213.

In one or more illustrative embodiments, data detection and classification associated with ML classification sub-system 210 is realized in edge computing network 105 as one or more software modules in edge endpoints (which can, for example, be components of each edge computing site 104 and/or each edge device 106). As applications produce data (part of input data 202), each policy agent 213 monitors filesystem, object store and streaming topics to identify the source application. In some embodiments, policy agents 213 use a two-tier detection framework: (i) direct detection; and (ii) indirect detection.

Direct detection operates by monitoring filesystems, object stores and/or streaming systems for: (i) a filesystem open to create a new file or write new data to an existing file; (ii) object store REST or key-value (KV) calls for writing a new object; or (iii) streaming topics and new enrollment membership to publish a stream.

Indirect detection operates by monitoring the directory structure, or object store or streaming logs for the appearance of new files, objects and streams by comparing a snapshot in a time series to detect delta data structures. Input data 202 also comprises predefined (manifest) knowledge from the edge orchestration system of filesystems, object stores, and streams from the application orchestration scheduling. Advantageously, data detection performed by policy agents 213, according to illustrative embodiments, do not necessarily need inline webhooks or software shim layers which can impair or obstruct application performance, however, can still yield very high probability of near real time detection of data production.

More particularly, each policy agent includes, or otherwise has access to, a pretrained ML library selected based on a set of use cases tied to the purposes of the edge computing network 105. For example, in the case of an enterprise edge computing network, use cases may include, but are not limited to, manufacturing, retail, energy, logistics, etc. Telco or emerging edge computing platforms have their own specific use cases (e.g., metaverse, robotics, etc.). The use case is known at the instantiation of an edge node. Each policy agent 213 has a corresponding random forest classifier (classifier 215) with a tree structure and weights predefined. With this predefined classifier and input knowledge determined by the detection process, ML classification sub-system 210 is configured to read a portion of a given data structure to determine the remaining input knowledge. ML classification sub-system 210 then classifies the data structure and determines intent which is then used by the overall data management framework of the multicloud edge platform to inform services and movement policy as well as advertise the existence, type and location of the data. As will be further explained below, ML classification sub-system 210 is continually optimized in near real-time by feature extraction and selection sub-system 220.

Figure 3:
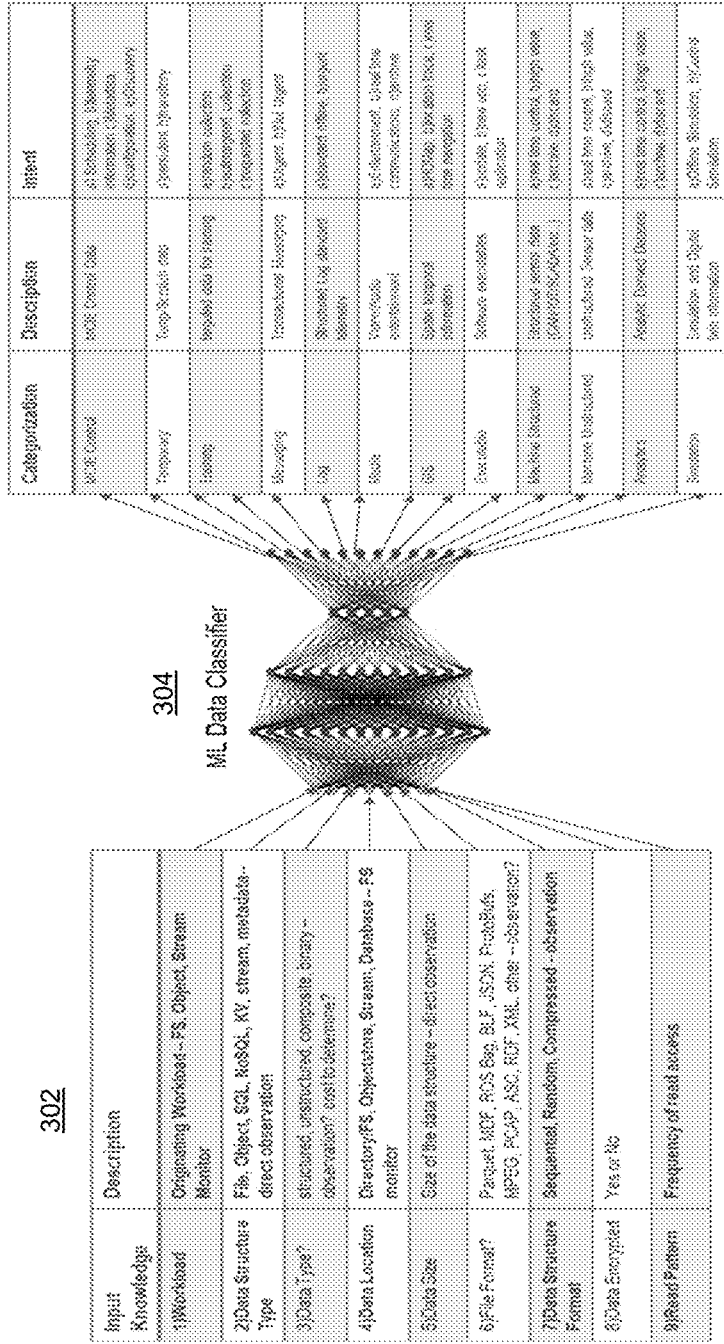
FIG. 3 illustrates an exemplary machine learning classification process to derive data intent according to an illustrative embodiment.

By way of example only, FIG. 3 illustrates an exemplary use case of intent derivation 300 using an ML classifier based on input knowledge. More specifically, based on input knowledge 302 (e.g., part of input data 202 in FIG. 2), a predefined ML classifier 304 (e.g., classifier 215) generates intent classification results 306. However, it is to be appreciated that ML classification sub-system 210 is not limited to this or any particular use case.

It is to be understood that another key aspect of ML classification sub-system 210 is the policy control framework of the classifiers 215. The classifiers 215 along with the near real-time framework of feature extraction/selection (feature extraction and selection sub-system 220) and meta-learning framework (parametric meta-learning decisioning sub-system 230) still must contend with a very large space/catalog of data production. In order to limit the pressure on feature discovery and meta-learning, classifiers 215 are optimized based on edge verticals (e.g., retail, manufacturing, automotive/logistics, telecommunications, etc.). Architecture 200 can obtain the verticals based on manifest-provided information and originating customer, application name etc. The classifier 215 still needs to manage multiple technical use cases, however, by limiting to a vertical, this can help optimize inference score and velocity. A policy manager in ML classification sub-system 210 can assign classifiers appropriate to the end system supported verticals. Also, applications can be tagged by verticals on the system so that the classifiers 215 can be appropriately applied.

In some embodiments, ML classification sub-system 210 uses a bagging or boosting method of training. The decision trees of classifiers 215 are segmented and predictions are tracked for inference values. This creates a dataset that can be used by feature extraction and selection sub-system 220 to replace decision trees to yield overall better inference prediction. The segmentation of the decision tree is important as this structure allows for efficient model optimization by replacing one set of trees with an updated tree segment.

Upon classification of the semantics of the data structure, architecture 200 can populate metadata (part of 240) for upload into a catalog for centralized applications and a platform based global name assigned to the data structure and advertise through data networking mechanisms for consumption of edge applications and this name can be accessed by the edge orchestration framework to make application/service placement decisions.

Advantageously, as illustratively explained in detail above, ML classification sub-system 210 leverages open policy framework rules for classification policy selection and uses random forest classification for actual classification. The random forest weights can also be based on online unsupervised training. ML classification sub-system 210 can classify data structures by intent which enables the multicloud edge platform (information processing system environment 100) to better manage data in the context of initial application scheduling and lifecycle management. This allows the multicloud edge platform to locate and manage data movement. ML classification sub-system 210 uses a multicloud edge platform policy framework to automatically select the most appropriate random forest classifier for the application vertical use case. The random forest classifier can be modified in near real-time with new decisioning parameters from higher level frameworks (feature extraction and selection sub-system 220 and parametric meta-learning decisioning sub-system 230) to adjust for drift and other impairments. ML classification sub-system 210 can operate across a large number of use cases across a vertical and does not necessarily require specific knowledge of the application or rules-based pre-configurations.

Turning now to feature extraction and selection sub-system 220, as mentioned above, illustrative embodiments are configured to locally optimize the performance of a data classification process such as classification performed by ML classification sub-system 210. However, while feature extraction and selection sub-system 220 is shown in FIG. 2 as being integrated in architecture 200, it is to be appreciated that feature extraction and selection sub-system 220 can be used in other implementations separate from architecture 200.

In the FIG. 2 embodiment, feature extraction and selection sub-system 220 provides for optimization of classifiers 215. More particularly, feature extraction and selection sub-system 220 is configured to evaluate produced data (in near real-time) to select suitable features that can be programmed to support the classification framework of ML classification sub-system 210.

With requirements mentioned herein, illustrative embodiments focus on mechanisms to limit the dimensionality of the feature space to enable better accuracy with reduced complexity (smaller number of features). It is realized herein that a hybrid approach comprising integration of filters and wrappers is a computationally effective method for feature selections. Accordingly, as depicted in FIG. 2, feature extraction and selection sub-system 220 comprises a plurality of feature agent modules 221-1, 221-2, 221-3, . . . , 221-N (collectively referred to as feature agents 221 or individually as feature agent 221) operatively coupled to respective policy agents 213 of ML classification sub-system 210. As shown, each feature agent 221 comprises filter and wrapper functionalities as further described below.

Filters offer the advantage of performance versus wrappers but are also less accurate. The combination helps avoid both weaknesses when used in sequences (e.g., filters then wrappers). Multilevel feature selection is applied coarse to fine. Filters are used to rank feature applicability in the online training, e.g., a goal may be to reduce to the top 128 candidate features from the file to optimal optimization features. An optimal convergence may be at less than 10 features. The filter also identifies the target bagged decision trees for potential optimization. The lower ranked feature size set is due to the optimization nature of architecture 200 versus training from scratch. Wrappers are then used to nominate features for promotion to ML classification sub-system 210.

More particularly, filters are used in feature ranking. Entropy is calculated for a data structure or segment of a data structure (a fixed sized). Information gain evaluation is realized through information gain and relative information gain comparison to the class. Association to the random forest tree set is achieved by a bagging or boosting method. Illustrative embodiments do not assume a statistical model for calculation of feature ranking.

Wrappers are used for fine grain selection. Wrappers use greedy techniques for feature selection to optimize model inference performance. Illustrative embodiments use step-wise selection which uses a combination of sequential forward selection and backward elimination to seek an optimal set of features. The step-wise selection eliminates irrelevant features and seeks an optimal set of features by recursively including and excluding features.

Accordingly, each feature agent 221 captures features as they are discovered, and selectively updates the corresponding classifier 215 when an optimizing feature is discovered in order to manage drift in the random forest classification. Feature extraction and selection system is locally optimizing the performance of the data management ML classifier. One or more of feature agents 221 can also advertise features to parametric meta-learning decisioning sub-system 230 that reach a performance improvement level and could have global opportunity for improvement.

Advantageously, feature extraction and selection sub-system 220 operates in a domain (multicloud edge platform) where data is produced dynamically, and thus integrates input knowledge to enhance the selection process and prioritization of features without assumption of a statistical model or a pre-learned ML model. Further, in one or more illustrative embodiments, feature extraction and selection sub-system 220 operates on edge and cloud end points working with the random forest classifiers. This enables custom optimization and near real-time feedback. Feature extraction and selection sub-system 220 can use heuristic techniques to determine if the local classification model should be updated. Still further, feature extraction and selection sub-system 220 identifies features of relative importance and deploys them locally based on achieving a threshold. By way of example, if the model inference performance improves by a targeted level, the feature is advertised to a meta-learning framework (parametric meta-learning decisioning sub-system 230) for consideration in adoption to the global models for performance improvement.

Turning now to parametric meta-learning decisioning sub-system 230, as mentioned above, illustrative embodiments are configured to select appropriate training features for the classifier framework (ML classification sub-system 210) by retaining a memory of global classification efficacy for a particular edge vertical. Such a meta-learning framework enables architecture 200 to focus on global feature selection for offline training of overall edge vertical classifiers, and on global platform optimization through feature selection for offline training of overall edge vertical classifiers. However, while parametric meta-learning decisioning sub-system 230 is shown in FIG. 2 as being integrated in architecture 200, it is to be appreciated that parametric meta-learning decisioning sub-system 230 can be used in other implementations separate from architecture 200.

More particularly, in one or more illustrative embodiments, parametric meta-learning decisioning sub-system 230 is configured to: (i) collect information advertised from the feature extraction/selection process (feature extraction and selection sub-system 220); (ii) execute a reinforcement learning (RL) process using a Deep Recurrent Q Network (DRQN) to determine globally optimal parameters; and (iii) propagate the feature selection parameters to the training for the extraction/selection process (feature extraction and selection sub-system 220).

Accordingly, as depicted in FIG. 2, parametric meta-learning decisioning sub-system 230 comprises a policy control and objectives layer 232, a model parameter capture and propagation layer 234, and a plurality of RL DRQN agent modules 235-1, 235-2, 235-3, . . . , 235-N (collectively referred to as RL DRQN agents 235 or individually as RL DRQN agent 235) operatively coupled to respective feature agents 221 of feature extraction and selection sub-system 220. The RL DRQN agents 235 constitute at least a portion of the DRQN.

As explained above in the context of ML classification sub-system 210, the semantic data classification process operates on edge endpoints and classifies data by semantic intent produced on the edge endpoint. The data classifiers use random forest classifiers. These classifiers are programmed based on a feature set tied to an edge vertical use case and are tied to endpoints operating in this use case. Further, in the context of feature extraction and selection sub-system 220, the feature extraction and selection processes operate locally on the system endpoint optimizing the feature selection and prioritization for training/programming the data management classifiers. The feature extraction advertises when it makes an optimization to the classifiers and the impact on the inference probability score. This is performed for all classifiers.

This information is collected by parametric meta-learning decisioning sub-system 230. Parametric meta-learning decisioning sub-system 230 operates at the domain level (e.g., a central location in a federated edge for endpoint control) in a central control zone. More particularly, parametric meta-learning decisioning sub-system 230 uses an DRQN system in the form of RL DRQN agents 235 to explore the Partially Observable Markov Decision Process (POMDP) space to determine if the optimization is applicable to global data classification at either the vertical use case or global across all data classifiers. Applicability is defined as the inclusion of the feature and/or parameters into the decision tree set adding additional bootstrap samples classifiers. Parametric meta-learning decisioning sub-system 230 uses a DRQN to globally optimize the performance of the data management intent classifiers of ML classification sub-system 210.

The RL framework used by parametric meta-learning decisioning sub-system 230 is setup for input, received by policy control and objectives layer 232 and a model parameter capture and propagation layer 234 (referred to herein below as "collection system"), to determine relationships between feature selection and classifier inference scores. The collection system has prior knowledge of feature selection. The collection system observes the operation of the local feature selection and extraction process. When a new feature is observed with sufficient frequency (e.g., above a threshold) with improved performance, the collection system reports the feature and the output to the DRQN.

The DRQN adds this as an input state and action with other capabilities. The system state and actions create an action state space that the RL DRQN agents 235 can explore for optimality. The DRQN explores this space with an objective of maximizing the data classifier score and uses existing and new candidate features seeking to maximize the overall data management classifier score. This optimization is important as the overall data classifier should be optimized (versus a single dataset classification). This leads to a large space hence the advantage of using a POMDP DRQN process which can memorize earlier states.

The data management classifiers of ML classification sub-system 210 are optimized for specific use cases. However, a feature discovered from one data management classifier could be applicable to another data classifier use case. For a feature found useful, it will be submitted as a potential action-state feature for other data classifiers. This defines a meta-learning framework that is global in significance and can propagate training set optimizations to all systems.

If the DRQN learns additional features have global significance, it will propagate these features to the feature extraction/selection process (feature extraction and selection sub-system 220) within the domain for the data management classifiers where the DRQN determined it had utility. Parametric meta-learning decisioning sub-system 230 also advertises the new feature training bootstraps via policy control (policy control and objectives layer 232) for propagation (model parameter capture and propagation layer 234) across domains for the relevant data classifiers.

Figure 4:
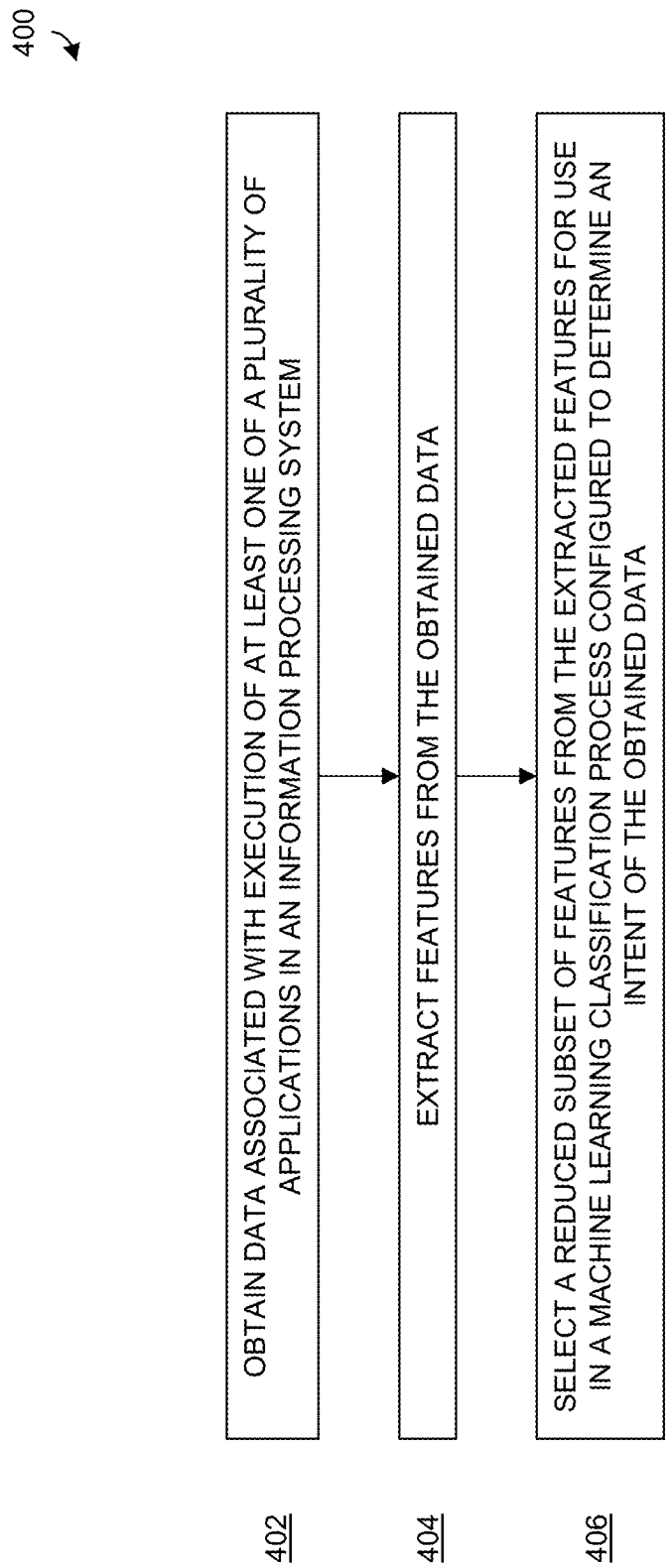
FIG. 4 shows a process flow for data characterization according to an illustrative embodiment.

FIG. 4 shows a process flow 400 for data feature extraction and selection according to an illustrative embodiment. In one or more exemplary embodiments, process flow 400 is performed in accordance with information processing system environment 100 (i.e., multicloud edge platform) in conjunction with data characterization engine 120 using feature extraction and selection sub-system 220.

As shown, process flow 400 begins in step 402 which obtains data associated with execution of at least one of a plurality of applications in an information processing system. Step 404 extracts features from the obtained data. Step 406 selects a reduced subset of features from the extracted features for use in a machine learning classification process configured to determine an intent of the obtained data.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionalities described herein will now be described in greater detail with reference to FIGS. 5 and 6. Although described in the context of information processing system environment 100, these platforms may also be used to implement at least portions of other information processing systems in other embodiments.

Figure 5:
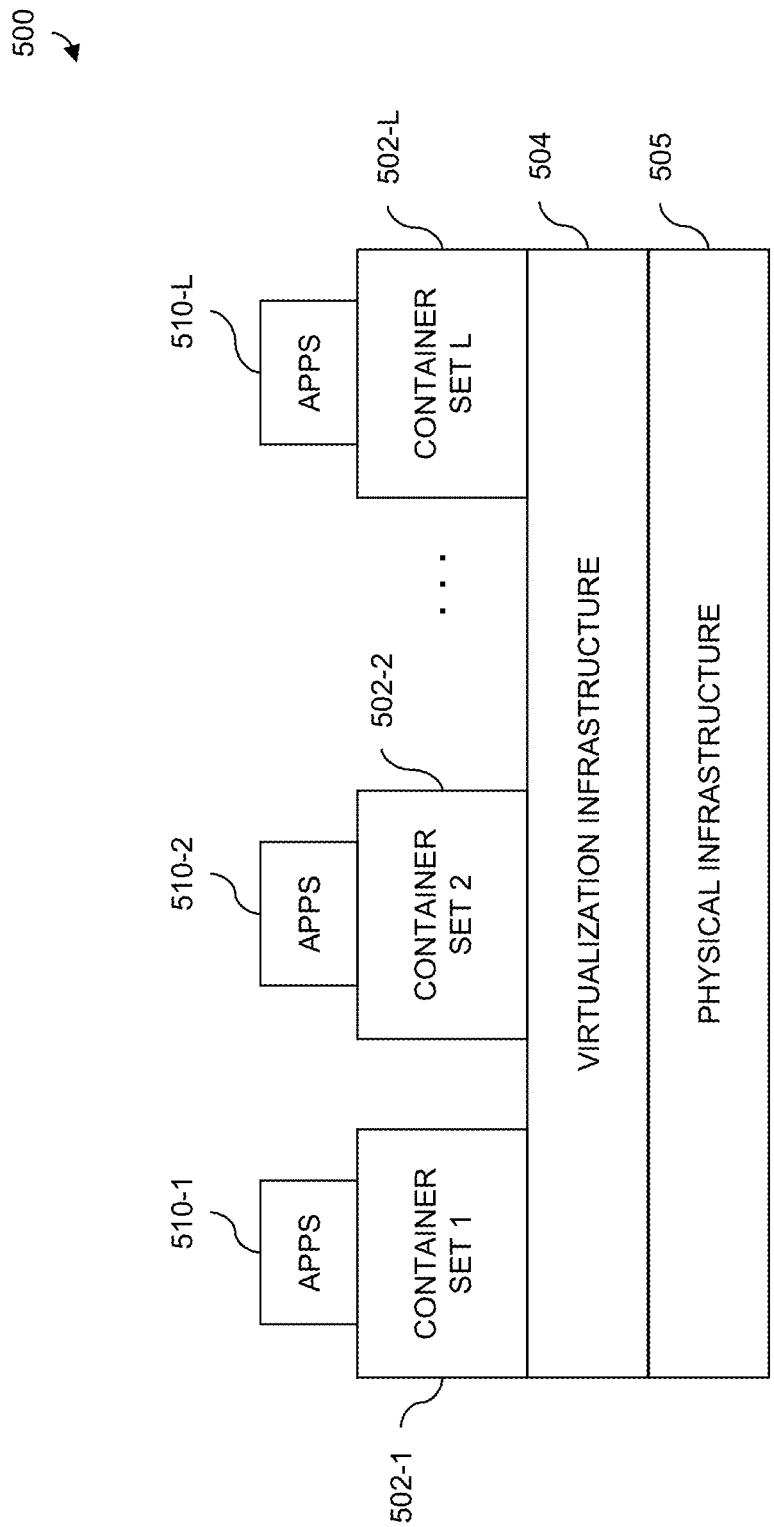
FIGS. 5 and 6 illustrate examples of processing platforms that may be utilized to implement at least a portion of an information processing system in illustrative embodiments.
Figure 6:
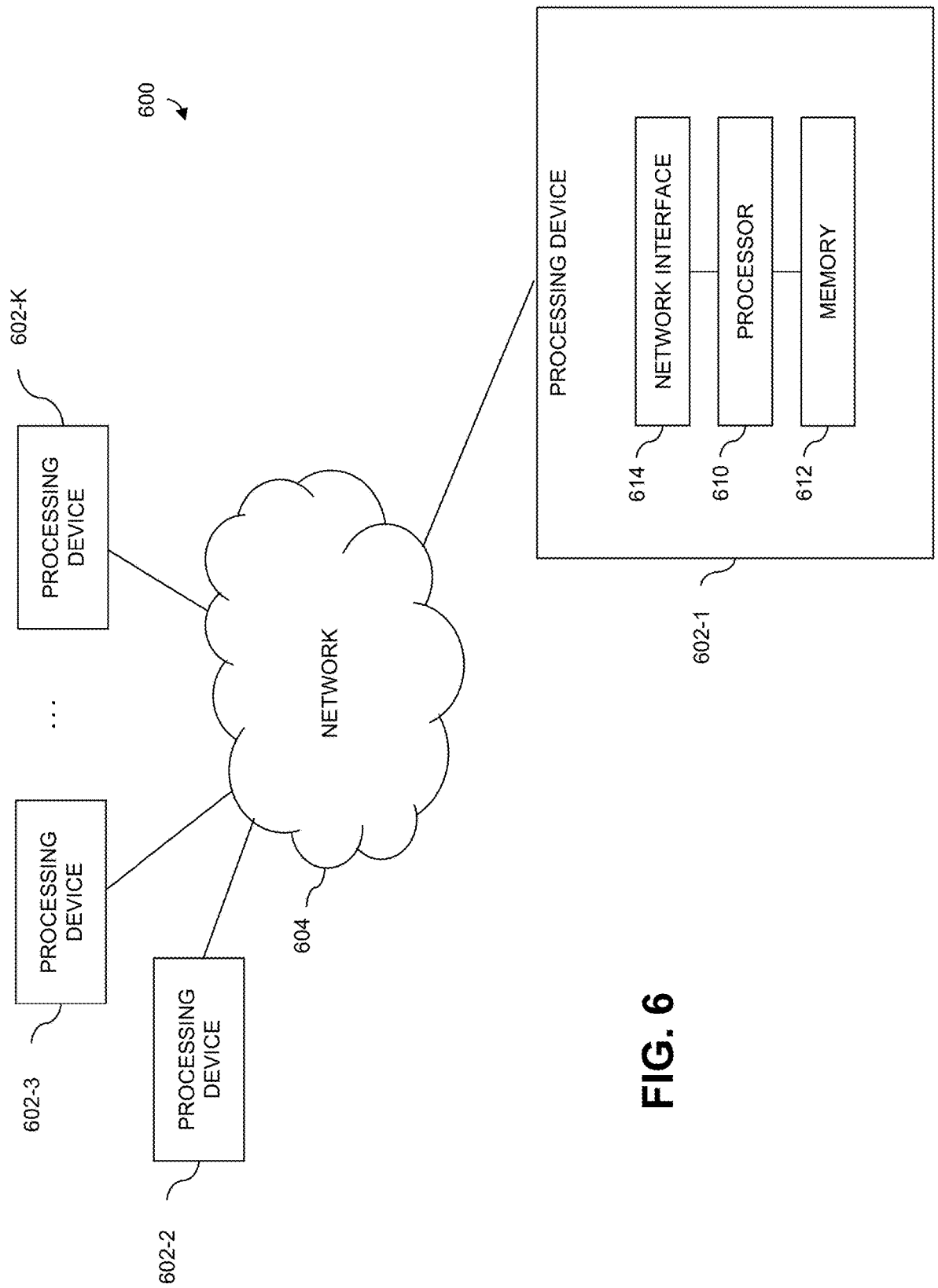

FIG. 5 shows an example processing platform comprising infrastructure 500. Infrastructure 500 comprises a combination of physical and virtual processing resources that may be utilized to implement at least a portion of the information processing system environment 100 in FIG. 1. Infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

Infrastructure 500 further comprises sets of applications 510-1, 510-2, ... 510-L running on respective ones of the VMs/container sets 502-1, 502-2, ... 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. A hypervisor platform may be used to implement a hypervisor within the virtualization infrastructure 504, where the hypervisor platform has an associated virtual infrastructure management system. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of information processing system environment 100 may each run on a computer, server, storage device or other processing platform element. A given such element may be viewed as an example of what is more generally referred to herein as a "processing device." Infrastructure 500 shown in FIG. 5 may represent at least a portion of one processing platform. Another example of such a processing platform is processing platform 600 shown in FIG. 6.

The processing platform 600 in this embodiment comprises a portion of system 60 and includes a plurality of processing devices, denoted 602-1, 602-2, 602-3, ... 602-K, which communicate with one another over a network 604.

The network 604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 602-1 in the processing platform 600 comprises a processor 610 coupled to a memory 612.

The processor 610 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 612 may comprise random access memory (RAM), read-only memory (ROM), flash memory or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments.

A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and information processing system environment 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the data characterization functionalities as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, edge computing environments, applications, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing platform comprising at least one processor coupled to at least one memory, the at least one processing platform, when executing program code, is configured to:
   obtain data associated with execution of at least one of a plurality of applications in an information processing system;
   extract features from the obtained data;
   monitor, with a first agent of a plurality of first agents, the obtained data to identify a source application of the plurality of applications, wherein each first agent has a corresponding classifier for use in a machine learning classification process, and wherein each first agent is operatively coupled to a pretrained machine learning library selected based on a defined purpose of the information processing system;

capture the extracted features, in response to discovery thereof, using a second agent of a plurality of second agents, wherein respective ones of the plurality of second agents are operatively coupled to respective ones of the plurality of first agents and their corresponding classifiers;

select, using the second agent, a reduced subset of features from the extracted features for use in the machine learning classification process configured to determine an intent of the obtained data;

selectively update, using the second agent, the corresponding classifiers wherein an improving feature is discovered;

send an alert to the information processing system of an existence, a type, and a location of the obtained data; and determine, using a third agent of a plurality of third agents, if the improving feature is applicable to all of the corresponding classifiers, wherein respective ones of the plurality of third agents are operatively coupled to respective ones of the plurality of second agents.

2. The apparatus of claim 1, wherein selecting a reduced subset of features from the extracted features further comprises a combination of a feature ranking process and a fine grain selection process.

3. The apparatus of claim 2, wherein the feature ranking process further comprises utilizing one or more filters configured to calculate an entropy measure and perform an information gain evaluation to determine a ranking of the extracted features.

4. The apparatus of claim 3, wherein, in response to the feature ranking process, the fine grain selection process further comprises utilizing one or more wrappers configured to perform a sequential forward selection and backward elimination process to generate the reduced subset of features.

5. The apparatus of claim 1, wherein machine learning classification process comprises a random forest classification process.

6. The apparatus of claim 1, wherein the at least one processing platform is configured to cause an update of the machine learning classification process based on the reduced subset of features.

7. The apparatus of claim 1, wherein the plurality of first agents comprise a plurality of policy agents, and wherein the plurality of second agents comprise a set of feature agent modules that respectively correspond to the plurality of policy agents, each policy agent respectively corresponding one or more different policies, for performing the obtaining, extracting and selecting.

8. The apparatus of claim 1, wherein the information processing system comprises a distributed edge system.

9. The apparatus of claim 8, wherein the distributed edge system is part of a multicloud edge platform.

10. A computer program product comprising a non-transitory processor-readable storage medium having stored therein program code of one or more software programs, wherein the program code when executed by at least one processing device causes the at least one processing device to:

obtain data associated with execution of at least one of a plurality of applications in an information processing system;

extract features from the obtained data;

monitor, with a first agent of a plurality of first agents, the obtained data to identify a source application of the plurality of applications, wherein each first agent has a corresponding classifier for use in a machine learning classification process, and wherein each first agent is operatively coupled to a pretrained machine learning library selected based on a defined purpose of the information processing system;

capture the extracted features, in response to discovery thereof, using a second agent of a plurality of second agents, wherein respective ones of the plurality of second agents are operatively coupled to respective ones of the plurality of first agents and their corresponding classifiers;

select, using the second agent, a reduced subset of features from the extracted features for use in the machine learning classification process configured to determine an intent of the obtained data;

selectively update, using the second agent, the corresponding classifiers wherein an improving feature is discovered;

send an alert to the information processing system of an existence, a type, and a location of the obtained data; and determine, using a third agent of a plurality of third agents, if the improving feature is applicable to all of the corresponding classifiers, wherein respective ones of the plurality of third agents are operatively coupled to respective ones of the plurality of second agents.

11. The computer program product of claim 10, wherein selecting a reduced subset of features from the extracted features further comprises a combination of a feature ranking process and a fine grain selection process.

12. The computer program product of claim 11, wherein the feature ranking process further comprises utilizing one or more filters configured to calculate an entropy measure and perform an information gain evaluation to determine a ranking of the extracted features.

13. The computer program product of claim 12, wherein, in response to the feature ranking process, the fine grain selection process further comprises utilizing one or more wrappers configured to perform a sequential forward selection and backward elimination process to generate the reduced subset of features.

14. The computer program product of claim 10, wherein machine learning classification process comprises a random forest classification process.

15. The computer program product of claim 10, further comprising causing an update of the machine learning classification process based on the reduced subset of features.

16. The computer program product of claim 10, wherein the information processing system comprises a distributed edge system.

17. The computer program product of claim 16, wherein the distributed edge system is part of a multicloud edge platform.

18. A method comprising:
obtaining data associated with execution of at least one of a plurality of applications in an information processing system;
extracting features from the obtained data;

monitoring, with a first agent of a plurality of first agents, the obtained data to identify a source application of the plurality of applications, wherein each first agent has a corresponding classifier for use in a machine learning classification process, and wherein each first agent is operatively coupled to a pretrained machine learning library selected based on a defined purpose of the information processing system;

capturing the extracted features, in response to discovery thereof, using a second agent of a plurality of second agents, wherein respective ones of the plurality of second agents are operatively coupled to respective ones of the plurality of first agents and their corresponding classifiers;

selecting, using the second agent, a reduced subset of features from the extracted features for use in a machine learning classification process configured to determine an intent of the obtained data;

selectively updating, using the second agent, the corresponding classifiers wherein an improving feature is discovered;

sending an alert to the information processing system of an existence, a type, and a location of the obtained data; and determining, using a third agent of a plurality of third agents, if the improving feature is applicable to all of the corresponding classifiers, wherein respective ones of the plurality of third agents are operatively coupled to respective ones of the plurality of second agents;

wherein the method is implemented on a processing platform comprising at least one processor, coupled to at least one memory, executing program code.

19. The method of claim 18, wherein selecting a reduced subset of features from the extracted features further comprises a combination of a feature ranking process and a fine grain selection process.

20. The method of claim 18, further comprising causing an update of the machine learning classification process based on the reduced subset of features.

* * * * *